2,899,419

PROCESS FOR OLEFIN POLYMERIZATION WITH ALKYL ALUMINUM-METAL OXIDE CATALYST

Robert R. Chambers, Homewood, and Robert H. Elkins, Flossmoor, Ill., and John J. Monagle, Chester, Pa., assignors to Sinclair Refining Company, New York, N.Y., a corporation of Maine No Drawing. Application April 16, 1957
Serial No. 653,070

5 Claims. (Cl. 260—94.9)

This invention relates to polymerization reactions of the $C_2$ to $C_3$ olefins using a catalyst comprising a tri-lower alkyl aluminum and a material produced by calcination of a mixture of solid metal oxides. The invention provides a method whereby ethylene and propylene may be polymerized to solid polymers at low pressures, for example, atmospheric pressure.

We have found that the method of this invention, provides solid polymers through contact of a $C_2$ or $C_3$ olefin, i.e. ethylene or propylene, with catalytic amounts of a tri-lower alkyl aluminum compound and the product of calcining a mixture containing magnesium oxide and a material selected from the group consisting of titanium dioxide and zirconium dioxide. Advantageously, the polymerization is carried out by passing the olefin into a reaction medium comprising an organic solvent having dissolved therein the tri-lower alkyl aluminum compound and having dispersed therein the solid product of calcining the oxide mixture.

The catalyst employed in my method is comprised of two essential components which are the tri-lower alkyl aluminum and the calcined mixture of magnesium and titanium or zirconium oxides. Preferred among the trialkyl aluminums are the primary tri-alkyl aluminums, for instance containing up to four carbon atoms such as triethyl aluminum and tri-2-methyl propyl aluminum (triisobutyl aluminum). The metal oxide catalyst component must be made by calcining a mixture of oxides, hence, according to the invention, the oxides used are mixed before their calcination.

The oxide mixture includes magnesium oxide and the dioxide of titanium and/or zirconium. The ratio of magnesium oxide to the titanium or zirconium oxide component is not critical as long as each is present in an amount sufficient to provide a catalytic effect. Preferably the mole ratio of these components is about 0.5 to 1.0 of the magnesium oxide to one mole of the other oxide component. If any oxide component be in too great an excess the activity of the catalyst on a weight basis can be affected as such separate components have no substantial catalytic effect. Advantageously, the mixed oxides are subjected to water digestion prior to calcination. Thus, the oxide mixture catalyst component can be made by digesting in a water medium magnesium oxide and titanium dioxide and/or zirconium dioxide, separating solid digestion residue from the accompanying aqueous phase, and calcining a mixture of the digested oxides. The calcination of the mixed oxides can be effected at temperatures of at least about 400° C., preferably 450 to 700° C. Generally, the calcination is for at least about 0.5 hour while the digestion, if employed, is for at least about 6 hours, preferably about 16 to 24 hours.

Conveniently, the tri-lower alkyl aluminum compound used in the method of the invention is dissolved in an organic solvent and the oxide mixture catalyst component, in the form of fine solid particles, is dispersed therein. However, the reaction can be carried out in bulk, i.e. in the absence of a solvent. If no solvent be used, the oxide particles can be dispersed in the tri-lower alkyl aluminum compound. Many organic solvents are suitable for use in the method of the invention and such include any of the aliphatic hydrocarbons such as pentane, hexane, iso-octane, and the like, and aromatic solvents such as benzene, toluene, xylene, etc. Solvents which would interact with the catalyst, of course, cannot be used. The aliphatic hydrocarbons are preferred as are the saturated hydrocarbon solvents containing about 4 to 10 carbon atoms.

The composition of the reaction mixture can vary widely. The concentration of the catalyst is not critical. The mole ratio of the catalyst to olefin is usually above about 0.001 and preferably is in the range of about 0.001 to 0.3. The weight ratio of the calcined oxide mixture catalyst component to tri-lower alkyl aluminum compound is advantageously in the range of about 1 to 10 parts of the oxide mixture to 1 part of aluminum compound, and preferably this ratio is about 5 parts of oxide mixture to 1 part of aluminum compound. Where a solvent is used, the concentration of catalyst in the solvent is not critical.

The reaction conditions of temperature and pressure can vary widely. Advantageously, the pressure at which the polymerization is carried out is atmospheric; however, higher pressures up to the highest pressures obtainable can be used. Moreover, the pressure of the olefin can be below atmospheric, for example, a mixture of ethane and ethylene can be used. The pressure is sufficient to maintain the liquid phase and preferably is not above about 1000 p.s.i. The temperature of polymerization can be very low, for example −20° C., or very high, for example as high as the boiling point at reaction pressure of the liquid medium in which the reaction is carried out. Advantageously, the temperature is in the range of about 150 to 400° C., but in certain instances the temperature may preferably be in the range of about 10 to 100° C.

The olefin employed is dry and relatively free from impurities which would deactivate the catalyst and the polymerization is carried out in an inert atmosphere, e.g. methane, propane, nitrogen or any atmosphere containing no significant amount of a material which would deactivate the catalyst. Examples of materials which would deactivate the catalyst are carbon dioxide, oxygen and water.

The invention may be better understood by reference to the following examples.

Example I

An oxide mixture suitable for use as the catalyst oxide component used in the method of the invention was made by dispersing 3100 grams of freshly precipitated hydrated titanium dioxide (equivalent to 351 grams of titanium dioxide, $TiO_2$) and 121 grams of calcined magnesite (equivalent to 117 grams of magnesium oxide, MgO) in 7 liters of water maintained at 71° C. The resulting mixture was digested at 71° C. for 24 hours while being stirred continuously. The digestion residue was then filtered off from the aqueous phase and dried at 110° C. The dried digestion residue was then ground to −100 mesh and then calcined 2 hours at 570° C.

Example II 275 ml. of n-heptane was placed in a 500 ml. flask equipped with a stirrer. The flask was purged with nitrogen and there was then added 25.4 grams of magnesium oxide-titanium oxide catalyst component (22% by weight magnesium oxide) prepared by the procedure of Example I, and 0.03 mole (about 6 grams) of triisobutyl aluminum. The resulting reaction medium was stirred and one mole of ethylene gas was passed through it in 1 hour at about 26° C. At the end of this time, the catalyst was deactivated by adding ethanol which decomposed the triisobutyl aluminum. Solid polyethylene was produced and deposited on the catalyst during the course of the reaction. The solid polyethylene is removed from the catalyst by the procedure of Example III.

*Example III*

250 ml. of xylene was placed in a 1 liter magne dash unit equipped with a glass liner. There was added to the xylene 25.3 grams of magnesium oxide-titanium oxide catalyst component (22% by weight magnesium oxide) prepared by the procedure of Example I and 0.03 mole (about 6 grams) of triisobutyl aluminum in 25 ml. of heptane. The bomb was flushed with nitrogen, sealed and heated to 200° C. Ethylene was added to a pressure of 430 p.s.i.g. Stirring was begun and continued for 4.5 hours while ethylene was added to maintain the pressure between 300 and 600 p.s.i.g. At the end of this time the total amount of ethylene added was 83.5 grams. The flow of ethylene gas and the stirring was stopped, and the mixture was allowed to cool. The reactor was opened to allow excess ethylene to escape. The catalyst was then inactivated by adding ethanol to decompose the triisobutyl aluminum. The catalyst was filtered from the solvent and washed with water and hydrochloric acid, water, ethanol and finally ether. The solid catalyst containing the solid polyethylene produced was extracted with boiling xylene and the resulting supernatant liquid contained the solid polyethylene which was separated and dried.

*Example IV*

Example II was repeated except that the oxide mixture catalyst component used was a calcined magnesium oxide-zirconium oxide (20.3% by weight magnesium oxide) prepared by the procedure of Example I (except that freshly precipitated hydrated zirconium oxide was used in place of freshly precipitated hydrated titanium dioxide) instead of the magnesium oxide-titanium oxide of Example II. Solid polyethylene was produced during the reaction and is separated from the catalsyt by the procedure of Example III.

Examples V, VI, VII and VIII which follow, demonstrate the necessity of using a combination of oxides according to the method of the invention.

*Example V*

Example II was repeated except that 25.0 grams of the product of calcining titanium dioxide at 650° C. for 2 hours was used in place of the magnesium oxide-titanium oxide catalyst component called for in Exampe II. No solid polymer was produced during this reaction.

*Example VI*

Example II was repeated except that 25 grams of commercial titanium dioxide (Lapine) after drying at 120° C. was used in place of the magnesium oxide-titanium oxide catalyst component called for in Example II. No solid polymer was produced during this reaction.

*Example VII*

Example II was repeated except that 25.0 grams of commercial zirconium dioxide (Lapine) calcined at 650° C. was used in place of the magnesium oxide-titanium oxide catalyst component called for in Example II. No solid polymer was produced during this reaction.

*Example VIII*

Example II was repeated except that the product of calcining commercial magnesium oxide at 570° C. for 2 hours was used in place of the magnesium oxide-titanium oxide catalyst component called for in Example II. No solid polymer was produced during this reaction.

The olefin polymers produced according to the invention are useful in making, for instance, electrical insulation, conduits containers, molded objects and many other products.

We claim:

1. The method of polymerizing a $C_2$ to $C_3$ olefin to obtain solid polymer which comprises contacting the olefin with a catalyst consisting essentially of a tri-lower alkyl aluminum and the solid product of calcining a mixture containing magnesium oxide and a material selected from the group consisting of titanium dioxide hydrate and zirconium dioxide hydrate.

2. The method of claim 1 in which the olefin is ethylene.

3. The method of claim 1 in which said catalyst is in a liquid hydrocarbon of about 4 to 10 carbon atoms.

4. The method of claim 1 in which the tri-lower alkyl aluminum is tri-2-methyl propyl aluminum.

5. The method of polymerizing ethylene to obtain solid polymer which comprises passing ethylene into a hydrocarbon solvent having dissolved therein tri-2-methyl propyl aluminum and dispersed therein the solid product of digesting in a water medium a mixture containing magnesium oxide and a material selected from the group consisting of titanium dioxide hydrate and zirconium dioxide hydrate, the mol ratio of magnesium oxide to oxide of said group being about 0.25 to 1.75:1, separating the solid digestion residue from the aqueous phase, and drying and calcining said residue, the proportion by weight of calcined residue and tri-2-methyl propyl aluminum present in said hydrocarbon solvent being about 1 to 10 parts of calcined residue to 1 part of tri-2-methyl propyl aluminum.

References Cited in the file of this patent

UNITED STATES PATENTS 2,234,367     Chesny _____ Mar. 11, 1941

FOREIGN PATENTS 533,362     Belgium _____ May 16, 1955